United States Patent
Higano et al.

(10) Patent No.: US 9,644,113 B2
(45) Date of Patent: May 9, 2017

(54) COMPOSITION FOR FORMING A THIN LAYER WITH LOW REFRACTIVE INDEX, MANUFACTURING METHOD THEREOF, AND MANUFACTURING METHOD OF A THIN LAYER WITH LOW REFRACTIVE INDEX

(71) Applicant: MITSUBISHI MATERIALS CORPORATION, Tokyo (JP)

(72) Inventors: Satoko Higano, Naka (JP); Kazuhiko Yamasaki, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 14/261,766

(22) Filed: Apr. 25, 2014

(65) Prior Publication Data
US 2015/0307525 A1    Oct. 29, 2015

(51) Int. Cl.
*C07F 7/18* (2006.01)
*C09D 183/02* (2006.01)
*C03C 17/00* (2006.01)

(52) U.S. Cl.
CPC .......... *C09D 183/02* (2013.01); *C03C 17/007* (2013.01); *C03C 17/009* (2013.01); *C03C 2217/478* (2013.01); *C03C 2217/732* (2013.01)

(58) Field of Classification Search
USPC ................. 556/478, 482, 483, 485
See application file for complete search history.

(56) References Cited

U.S. PATENT DOCUMENTS

| | | | |
|---|---|---|---|
| 2002/0014090 A1 | 2/2002 | Tsujino et al. | |
| 2011/0253951 A1* | 10/2011 | Yoshida | C08F 220/22 252/589 |
| 2013/0327252 A1 | 12/2013 | Higano et al. | |

FOREIGN PATENT DOCUMENTS

| JP | H02-003468 A | 1/1990 |
|---|---|---|
| JP | H08-027419 A | 1/1996 |
| JP | 08-122501 A | 5/1996 |
| JP | 2003-236977 A | 8/2003 |
| JP | 2007-025329 A | 2/2007 |
| JP | 2012-214772 A | 11/2012 |
| JP | 2012-216814 A | 11/2012 |

OTHER PUBLICATIONS

Search Report dated Sep. 25, 2014, issued for the corresponding European patent application No. 14166093.6.

* cited by examiner

*Primary Examiner* — Pancham Bakshi
(74) *Attorney, Agent, or Firm* — Locke Lord LLP; James E. Armstrong, IV; Nicholas J. DiCeglie, Jr.

(57) ABSTRACT

To provide a low refractive index film-forming composition for forming a low refractive index film which has a low refractive index, produces a strong antireflection effect, exhibits excellent adhesiveness with respect to a substrate, and is excellent in water repellency or antifouling properties of the coat surface; a production method of the composition; and a method for forming a low refractive index film. The low refractive index film-forming composition is prepared by generating a hydrolysate of (A) a silicon alkoxide by mixing the (A) silicon alkoxide with (B) water, (C) an inorganic acid or an organic acid, and (D) an organic solvent at a predetermined ratio, and mixing the hydrolysate with (E) silica sol, which is obtained by dispersing fumed silica particles in a liquid medium, at a predetermined ratio.

2 Claims, No Drawings

COMPOSITION FOR FORMING A THIN LAYER WITH LOW REFRACTIVE INDEX, MANUFACTURING METHOD THEREOF, AND MANUFACTURING METHOD OF A THIN LAYER WITH LOW REFRACTIVE INDEX

TECHNICAL FIELD

The present invention relates to a low refractive index film-forming composition for forming a low refractive index film used for display panels, solar cells, optical lens, camera modules, sensor modules, and the like. More specifically, the present invention relates to a low refractive index film-forming composition suitable for forming an antireflection film or the like which is for preventing reflection of incident light in solar cells and the like, an intermediate film which is used in sensors, camera modules, and the like and utilizes a refractive index difference, or the like, a method for producing the composition, and a method for forming a low refractive index film.

BACKGROUND ART

A low refractive index film, which is formed on the surface of a transparent substrate such as glass or plastic, is used as an antireflection film for preventing reflection of incident light in display panels such as a cathode ray tube, liquid crystals, and an organic EL; glass for solar cells, optical lens, and a showcase; and the like. For example, the display surface of the display panel is covered with the antireflection film for improving visibility. Alternatively, in the field of solar cells, in order to prevent reflection of incident sunlight and increase the absorptance of light, a low refractive index film is formed as the antireflection film on the surface and the like of a glass substrate.

As such an antireflection film, a monolayer film, which is formed by a gas-phase method such as a vacuum deposition method or a sputtering method and formed of $MgF_2$, cryolite, or the like, has been commercialized in the related art. Moreover, a multilayer film or the like, which is formed by alternately layering a low refractive index coat such as $SiO_2$ and a high refractive index coat such as $TiO_2$ or $ZrO_2$ on a substrate, is also known to produce a strong antireflection effect. However, the gas-phase method such as a vacuum deposition method or a sputtering method has a problem in terms of the production costs and the like since the apparatus and the like used for the method are expensive. Further, the method of forming a multilayer film by alternately layering a low refractive index coat and a high refractive index coat is not so practical since the production process thereof is complicated and the method takes a lot of time and trouble.

Accordingly, recently, in view of the production costs and the like, a coating method such as a sol-gel method has drawn attention. In the sol-gel method, generally, a sol-gel solution is prepared, a transparent substrate such as glass is coated with the solution, and then the resultant is subjected to drying, firing, and the like to form a film. However, the film formed by the sol-gel method has many problems in that the refractive index thereof is not as low as that of the film formed by the gas-phase method such as a vacuum deposition method, and the film exhibits poor adhesiveness with respect to a substrate and cracks.

As the low refractive index film formed using the sol-gel method, there is a disclosure regarding low refractive index antireflection film which is formed of (a) silica sol in which silica particles having a predetermined particle size have dispersed and (b) at least one kind of component selected from a group consisting of a hydrolysate of alkoxysilane, a hydrolysate of metal alkoxide, and a metal salt, and formed by coating a substrate with a coating solution containing an organic solvent that contains the above components in an intended proportion and then curing the resultant (for example, see Patent Document 1). According to the disclosure, in this film, particularly by using the silica particles in a specific proportion, fine concavities and convexities are formed on the coat surface, and consequentially, while the refractive index is reduced, an excellent antireflection effect is obtained.

RELATED ART DOCUMENT

Patent Document

[Patent Document 1] JP-A-1996-122501 (Claim 1, paragraphs [0008] and [0020])

DISCLOSURE OF THE INVENTION

Problem that the Invention is to Solve

However, for the film of the related art that is disclosed in Patent Document 1, a silica sol in which silica particles obtained by a so-called wet method have dispersed is used. Accordingly, the film has problems in that particularly the refractive index is not easily reduced to a sufficient degree, and a stronger antireflection effect is not obtained. Moreover, due to the silica particles, fine concavities and convexities are formed on the coat surface, and accordingly, the surface exhibits hydrophilicity. This leads to a problem in that dirt adheres to the film when the film is used as an anti reflection film. Therefore, the technique of forming a low refractive index film by a sol-gel method needs to be further improved.

An object of the present invention is to provide a low refractive index film-forming composition for forming a low refractive index film which has a low refractive index, produces a strong antireflection effect, exhibits excellent adhesiveness with respect to a substrate, and is excellent in water repellency or antifouling properties of the coat surface; a method for forming the composition; and a method for forming a low refractive index film.

Means for Solving the Problem

A first aspect of the present invention is a low refractive index film-forming composition which prepared by generating a hydrolysate of W a silicon alkoxide by mixing the (A) silicon alkoxide represented by the following Chemical Formula (1) with (B) water in a proportion of 0.5 parts by mass to 2.0 parts by mass, (C) an inorganic acid or an organic acid in a proportion of 0.005 parts by mass to 0.5 parts by mass, and (D) an organic solvent such as an alcohol, a glycol ether, or a glycol ether acetate in a proportion of 1.0 part by mass to 5.0 parts by mass based on 1 part by mass of the (A) silicon alkoxide, and mixing the hydrolysate with (E) a silica sol, which is obtained by dispersing fumed silica particles having an average particle size within a range of 5 nm to 50 nm and a specific surface area (BET value) within a range of 50 $m^2/g$ to 400 $m^2/g$ in a liquid medium, such that a proportion of $SiO_2$ in the (E) silica sol becomes 1 part by mass to 99 parts by mass when a proportion of $SiO_2$ in the hydrolysate is regarded as being 1 part by mass.

$$Si(OR)_4 \qquad (1)$$

(Here, R represents an alkyl group having 1 to 5 carbon atoms.)

A second aspect of the present invention is the invention based on the first aspect, in which the hydrolysate of the silicon alkoxide is generated by mixing the (A) silicon alkoxide with (F) a fluoroalkyl group containing silicon alkoxide represented by the following Chemical Formula (2) at a mass ratio of 1:0.6 to 1.6 (A:F), and mixing the (A) silicon alkoxide and the (F) fluoroalkyl group-containing silicon alkoxide with the (B) water in a proportion of 0.5 parts by mass to 2.0 parts by mass, oxalic acid, acetic acid, or formic acid as the (C) organic acid in a proportion of 0.005 parts by mass to 0.5 parts by mass, and an alcohol, glycol ether, or glycol ether acetate as the (D) organic solvent in a proportion of 1.0 part by mass to 5.0 parts by mass based on a total of 1 part by mass of the (A) and (F).

$$CF_3(CF_2)nCH_2CH_2Si(OR^1)_3 \qquad (2)$$

(Here, $R^1$ represents an alkyl group having 1 to 5 carbon atoms, and n represents an integer from 0 to 8.)

A third aspect of the present invention is a method for producing a low refractive index film-forming composition including generating a hydrolysate of (A) a silicon alkoxide by mixing the (A) silicon alkoxide represented by the following Chemical Formula (1) with (B) water in a proportion of 0.5 parts by mass to 2.0 parts by mass, (C) an inorganic acid or an organic acid in a proportion of 0.005 parts by mass to 0.5 parts by mass, and (D) an organic solvent such as an alcohol, a glycol ether, or a glycol ether acetate in a proportion of 1.0 part by mass to 5.0 parts by mass based on 1 part by mass of the silicon alkoxide, and mixing the hydrolysate with (E) a silica sol, which is obtained by dispersing fumed silica particles having an average particle size within a range of 5 nm to 50 nm and a specific surface area (BET value) within a range of 50 m²/g to 400 m²/g in a liquid medium, such that a proportion of $SiO_2$ in the (E) silica sol becomes 1 part by mass to 99 parts by mass when a proportion of $SiO_2$ in the hydrolysate is regarded as being 1 part by mass.

$$Si(OR)_4 \qquad (1)$$

(Here, R represents an alkyl group having 1 to 5 carbon atoms.)

A fourth aspect of the present invention is an invention based on the third aspect, in which the hydrolysate of the silicon alkoxide is generated by mixing the (A) silicon alkoxide with (F) a fluoroalkyl group-containing silicon alkoxide represented by the following Chemical Formula (2) at a mass ratio of 1:0.6 to 1.6 (A:F), and mixing the (A) silicon alkoxide and the (F) fluoroalkyl group-containing silicon alkoxide with the (B) water in a proportion of 0.5 parts by mass to 2.0 parts by mass, oxalic acid, acetic acid, or formic acid as the (C) organic acid in a proportion of 0.005 parts by mass to 0.5 parts by mass, and an alcohol, a glycol ether, or a glycol ether acetate as the (D) organic solvent in a proportion of 1.0 part by mass to 5.0 parts by mass based on a total of 1 part by mass of the (A) and (F).

$$CF_3(CF_2)nCH_2CH_2Si(OR^1)_3 \qquad (2)$$

(Here, $R^1$ represents an alkyl group having 1 to 5 carbon atoms, and n represents an integer from 0 to 8.)

A fifth aspect of the present invention is a method for forming a low refractive index film by using the composition of the first or second aspect or the composition produced by the method of the third or fourth aspect.

Advantage of the Invention

The low refractive index film-forming composition of the first aspect of the present invention is a composition which is prepared by generating a hydrolysate of (A) a silicon alkoxide by mixing the (A) silicon alkoxide with (B) water in a proportion of 0.5 parts by mass to 2.0 parts by mass, (C) an inorganic acid or an organic acid in a proportion of 0.005 parts by mass to 0.5 parts by mass, and (D) an organic solvent such as an alcohol, a glycol ether, or a glycol ether acetate in a proportion of 1.0 part by mass to 5.0 parts by mass based on 1 part by mass of the (A) silicon alkoxide, and mixing the hydrolysate with (E) a silica sol, which is obtained by dispersing fumed silica particles having an average particle size within a range of 5 nm to 50 nm and a specific surface area (BET value) within a range of 50 m²/g to 400 m²/g in a liquid medium, such that a proportion of $SiO_2$ in the (E) silica sol becomes 1 part by mass to 99 parts by mass when a proportion of $SiO_2$ in the hydrolysate is regarded as being 1 part by mass. Therefore, with the low refractive index film-forming composition of the present invention, it is possible to form a film that exhibits a refractive index of about 1.21 to 1.39 which is an extremely low level and has a strong antireflection effect. Moreover, if the composition is used, it is possible to form a film that exhibits excellent adhesiveness with respect to a substrate and is excellent in water repellency and antifouling properties of the coat surface.

The low refractive index film-forming composition of the second aspect of the present invention contains, as a silicon compound, (F) a fluoroalkyl group-containing silicon alkoxide in a predetermined proportion in addition to the (A) silicon alkoxide, and also contains the predetermined (C) organic acid and organic solvent. Accordingly, it is possible to form a film having a further reduced refractive index and further improved water repellency and antifouling properties of the coat surface.

In the method for producing a low refractive index film-forming composition of the third aspect of the present invention, the composition is prepared by generating a hydrolysate of (A) a silicon alkoxide by mixing the (A) silicon alkoxide with (B) water in a proportion of 0.5 parts by mass to 2.0 parts by mass, (C) an inorganic acid or an organic acid in a proportion of 0.005 parts by mass to 0.5 parts by mass, and (D) an organic solvent such as an alcohol, a glycol ether, or a glycol ether acetate in a proportion of 1.0 part by mass to 5.0 parts by mass based on 1 part by mass of the (A) silicon alkoxide, and mixing the hydrolysate with (E) silica sol, which is obtained by dispersing fumed silica particles having an average particle size within a range of 5 nm to 50 nm and a specific surface area (BET value) within a range of 50 m²/g to 400 m²/g in a liquid medium, such that a proportion of $SiO_2$ in the (E) silica sol becomes 1 part by mass to 99 parts by mass when a proportion of $SiO_2$ in the hydrolysate is regarded as being 1 part by mass. Accordingly, is possible to produce a low refractive index film-forming composition which can form a film that exhibits a refractive index of about 1.21 to 1.39 which is an extremely low level and has a strong antireflection effect. Moreover, if the composition formed by the above method is used, it is possible to form a film that exhibits excellent adhesiveness with respect to a substrate and is excellent in water repellency and antifouling properties of the coat surface.

In the method for producing a low refractive index film-forming composition of the fourth aspect of the present invention, the composition is prepared by adding, as a silicon compound, (F) a fluoroalkyl group-containing silicon alkoxide in a predetermined proportion in addition to the (A) silicon alkoxide, and using the predetermined (C) organic acid and organic solvent. Accordingly, if the composition obtained by the method is used, it is possible to form a film having a further reduced refractive index and further improved water repellency and antifouling properties of the coat surface.

In the method for forming a low refractive index film of the fifth aspect of the present invention, the film is formed of the low refractive index film-forming composition of the present invention or the composition obtained by the production method of the present invention. Accordingly, it is possible to form a film having a refractive index of about 1.21 to 1.39 which is an extremely low level and having a strong antireflection effect. Moreover, it is possible to form a film that exhibits excellent adhesiveness with respect to a substrate and is excellent in water repellency and antifouling properties of the coat surface.

BEST MODE FOR CARRYING OUT THE INVENTION

Hereinafter, embodiments of the present invention will be described.

The low refractive index film-forming composition of the present invention is prepared by mixing a hydrolysate of a specific silicon compound with the (E) silica sol obtained by dispersing fumed silica particles in a liquid medium (dispersion medium) at a predetermined ratio. The hydrolysate is generated by condensation caused by hydrolysis of the (A) silicon alkoxide represented by the following Chemical Formula (1).

$$Si(OR)_4 \quad (1)$$

(Here, in Formula (1), R represents an alkyl group having 1 to 5 carbon atoms.)

The (A) silicon alkoxide is formed into a hydrolysate so as to maintain the speed of reactivity and hardness of a coat obtained from the composition. For example, with a hydrolysate of silicon alkoxide containing an alkyl group having 6 or more carbon atoms, the hydrolysis reaction is caused slowly, it takes time to produce the composition, and hardness of the film obtained by coating the obtained composition is reduced in some cases.

Specific examples of the (A) silicon alkoxide represented by Formula (1) include tetramethoxysilane, tetraethoxysilane, methyltrimethoxysilane, ethyltrimethoxysilane, methyltriethoxysilane, ethyltriethoxysilane, vinyltrimethoxysilane, vinyltriethoxysilane, phenyltrimethoxysilane, phenyltriethoxysilane, and the like. Among these, tetramethoxysilane is preferable since a film having a high degree of hardness is obtained.

Moreover, the hydrolysate can contain a substance generated by condensation resulting from hydrolysis caused when the (A) silicon alkoxide is mixed with the (F) fluoroalkyl group-containing silicon alkoxide represented by the following Formula (2) at a predetermined ratio.

$$CF_3(CF_2)nCH_2CH_2Si(OR^3)_3 \quad (2)$$

(Here, in Formula (2), $R^1$ represents an alkyl group having 1 to 5 carbon atoms, and n represents an integer from 0 to 8.)

If the hydrolysate is used, the refractive index of the film can be further reduced, and water repellency and antifouling properties of the coat surface can be further improved. Specific examples of the (F) fluoroalkyl group-containing silicon alkoxide represented by Formula (2) include trifluoropropyl trimethoxysilane, trifluoropropyl triethoxysilane, tridecafluorooctyl trimethoxysilane, tridecaflucrooctyl triethoxysilane, heptadecafluorodecyl trimethoxysilane, heptadecafluorodecyl triethoxysilane, and the like. Among these, trifluoropropyl trimethoxysilane is preferable since it exhibits high hydrolysis reactivity and makes it easy to control the reaction.

When a hydrolysate of the (A) silicon alkoxide and the (F) fluoroalkyl group-containing silicon alkoxide is generated, it is preferable for the alkoxides to be mixed with each other at a mass ratio of 1:0.6 to 1.6 (A:F). If the mass ratio of the (F) fluoroalkyl group-containing silicon alkoxide to the (A) silicon alkoxide is too low, the effect of reducing the refractive index of the formed film becomes insufficient, and accordingly, the mass ratio between the (A) silicon alkoxide and the (F) fluoroalkyl group-containing silicon alkoxide is set within the above range. Moreover, if the mass ratio of the (F) fluoroalkyl group-containing silicon alkoxide to the (A) silicon alkoxide is too high, adhesiveness or hardness of the film deteriorates in some cases. The ratio between the (A) silicon alkoxide and the (F) fluoroalkyl group-containing silicon alkoxide is particularly preferably 1:0.65 to 1.3 (A:F) in terms of a mass ratio.

In order to generate a hydrolysate of the (A) silicon alkoxide represented by Formula (1) or a hydrolysate of the (A) silicon alkoxide and the (F) fluoroalkyl group-containing silicon alkoxide represented by Formula (2), the alkoxides are hydrolyzed (condensed) in an organic solvent. Specifically, for generating a hydrolysate of the (A) silicon alkoxide, the silicon alkoxide is mixed with the (B) water in a proportion of 0.5 parts by mass to 2.0 parts by mass, the (C) inorganic acid or organic acid in a proportion of 0.005 parts by mass to 0.5 parts by mass, and the (D) organic solvent in a proportion of 1.0 part by mass to 5.0 parts by mass based on 1 part by mass of the (A) silicon alkoxide. For generating a hydrolysate of the (A) silicon alkoxide and the (F) fluoroalkyl group-containing silicon alkoxide, the alkoxides are mixed with the (B) water in a proportion of 0.5 parts by mass to 2.0 parts by mass, the (C) inorganic acid or organic acid in a proportion of 0.005 parts by mass to 0.5 parts by mass, and the (D) organic solvent in a proportion of 1.0 part by mass to 5.0 parts by mass based on a total of 1 part by mass of the (A) silicon alkoxide and the (F) fluoroalkyl group-containing silicon alkoxide. Thereafter, by causing a hydrolysis reaction of the (A) silicon alkoxide or a hydrolysis reaction between the (A) silicon alkoxide and the (F) fluoroalkyl group-containing silicon alkoxide, the hydrolysate is obtained. If the proportion of the (B) water is lower than the lower limit of the above range, the refractive index is not sufficiently reduced, hence the proportion of the (B) water is limited within the above range. Further, if the proportion of the (B) water is higher than the upper limit of the above range, problems such as gelation of the reaction solution in the process of the hydrolysis reaction occur, and adhesiveness between the film and the substrate deteriorates. The proportion of the (B) water is particularly preferably 0.8 parts by mass to 3.0 parts by mass. In order to prevent mingling of impurities, it is desirable to use deionized water, pure water, or the like as the (B) water.

Examples of the (C) inorganic acid or organic acid include inorganic acids such as hydrochloric acid, nitric acid, or phosphoric acid and organic acids such as formic acid, oxalic acid, and acetic acid. It is particularly preferable to use formic acid among these. The (C) inorganic acid or organic acid functions as an acidic catalyst for accelerating the hydrolysis reaction, and if formic acid is used as the catalyst, it is easy to form a film having a lower refractive index and excellent transparency. If formic acid is used, acceleration of uneven gelation caused in the formed film is more effectively prevented, compared to the case in which other catalysts are used. If the proportion of the (C) inorganic acid or organic acid is lower than the lower limit of the above range, the reactivity becomes poor, and accordingly, a film having a low refractive index and excellent in water repellency is not formed. Hence, the proportion of the (C) inorganic acid or organic acid is limited within the above range. Even if the proportion of the (C) inorganic acid or organic acid is higher than the upper limit of the above range, the reactivity is not influenced, but problems such as corrosion of the substrate caused by the residual acid occur. The proportion of the (C) inorganic acid or organic acid is particularly preferably 0.008 parts by mass to 0.2 parts by mass.

As the (D) organic solvent, an alcohol, a glycol ether, or a glycol ether acetate is used. If an alcohol, a glycol ether, or a glycol ether acetate is used as the (D) organic solvent, coating properties of the composition is improved, and for example, when a hydrolysate of the (A) silicon alkoxide and the (F) fluoroalkyl group-containing silicon alkoxide is used, the alkoxides are easily mixed with each other. Hence, an alcohol, a glycol ether, or a glycol ether acetate is used as the (D) organic solvent. Examples of the alcohol include methanol, ethanol, propanol, isopropyl alcohol (IPA), and the like. Examples of the glycol ether include ethylene glycol monomethyl ether, diethylene glycol monomethyl ether, propylene glycol monomethyl ether, dipropylene glycol monomethyl ether, ethylene glycol monoethyl ether, diethylene glycol monoethyl ether, propylene glycol monoethyl ether, dipropylene glycol monoethyl ether, and the like. Examples of the glycol ether acetate include ethylene glycol monomethyl ether acetate, diethylene glycol monomethyl ether acetate, propylene glycol monomethyl ether acetate, dipropylene glycol monomethyl ether acetate, ethylene glycol monoethyl ether acetate, diethylene glycol monoethyl ether acetate, propylene glycol monoethyl ether acetate, dipropylene glycol monoethyl ether acetate, and the like. Among these, ethanol, IPA, ethylene glycol monomethyl ether, ethylene glycol monomethyl ether acetate, propylene glycol monomethyl ether, and propylene glycol monomethyl ether acetate are particularly preferable, since these make it easy to control the hydrolysis reaction and make it possible to obtain excellent coating properties at the time of forming a film. If the proportion of the (D) organic solvent is lower than the lower limit of the above range, problems such as gelation of the reaction solution in the process of the hydrolysis reaction easily occur, a film having a low refractive index and excellent in water repellency is not obtained, and adhesiveness between the film and the substrate deteriorates. Hence, the proportion of the (D) organic solvent is limited within the above range. If the proportion of the (D) organic solvent is higher than the upper limit of the above range, problems such as deterioration of reactivity of hydrolysis occur, and consequently, a film having a low refractive index and excellent in water repellency is not obtained. The proportion of the (D) organic solvent is particularly preferably 1.5 parts by mass to 3.5 parts by mass.

The (E) silica sol contained in the low refractive index film-forming composition of the present invention is a sol obtained by dispersing fumed silica particles, which have an average particle size within a range of 5 nm to 50 nm and a specific surface area (BET value) within a range of 50 $m^2/g$ to 400 $m^2/g$, in a liquid medium. As the silica sol, for example, there is a sol formed by dispersing a so-called wet-type silica (colloidal silica) that is obtained by neutralizing an aqueous sodium silicate solution with an acid or an alkali metal salt. However, in the present invention, a sol formed by dispersing a so-called dry method silica (fumed silica), which is obtained by a spray flame method in which flame hydrolysis is performed on a volatile silicon compound such as a silicon halide compound, is used. Examples of the fumed silica include "AEROSIL200 (registered trademark)" manufactured by Nippon Aerosil Co., Ltd., and the like. In the present invention, the silica sol obtained by dispersing fumed silica is used, because when such a silica sol is used, water repellency of the coat surface of the formed film can be further improved, compared to a case where a silica sol obtained by dispersing, for example, colloidal silica is used. Presumably, this is because the silica sol has an aggregate structure having hydrophobicity stronger than that of a sol of colloidal silica. Moreover, if the average particle size and specific surface area (BET value) of silica particles in the silica sol is limited within the above range, a film having a higher degree of transparency and a lower refractive index is obtained. If the average particle size of the silica particles is less than the lower limit of the above range, or alternatively, if the specific surface area of the silica particles is larger than the upper limit of the above range, problems in that the refractive index of the formed film is not sufficiently reduced occur. Hence, the average particle size and the specific surface area (BET value) of the silica particles are limited within the above range. In contrast, if the average particle size is larger than the upper limit of the above range, or alternatively, if the specific surface area is less than the lower limit of the above range, problems in that transparency of the formed film worsens occur. In the present invention, the average particle size refers a volume-based median size measured using a dynamic light scattering-type particle size distribution analyzer. Further, the specific surface area (BET value) refers to a value which is measured by nitrogen gas adsorption and obtained using a value calculated by a 3-point BET method.

For preparing the silica sol (E), stirring is performed under predetermined conditions, which will be described later, and as a result, the composition contains aggregates which are formed of silica particles aggregated in the form of beads and preferably have a size of 20 nm to 150 nm. If the composition contains the silica particles in the form of aggregates having a predetermined size, the effect of reducing refractive index of the film is further enhanced. If the size of the aggregate is less than the lower limit of the above range, coating properties deteriorate in some cases due to thickening of the composition. In contrast, if the size of the aggregate is larger than the upper limit of the above range, transparency of the formed film worsens in some cases. The size of the aggregate refers to a volume-based median size measured using the aforementioned dynamic light scattering-type particle size distribution analyzer.

For preparing the low refractive index film-forming composition of the present invention, the hydrolysate and the (E) silica sol are mixed with each other, such that the proportion of $SiO_2$ in the (E) silica sol becomes 1 part by mass to 99 parts by mass when the proportion of $SiO_2$ in the hydrolysate is regarded as being 1 part by mass. If the proportion of the (E) silica sol is lower than the lower limit of the above range, the refractive index of the formed film is not sufficiently reduced. In contrast, if the proportion of the (E) silica sol is higher than the upper limit of the above range, problems such as deterioration of transparency or hardness of the formed film occur, and adhesiveness between the film and the substrate also deteriorates. It is particularly preferable to set the proportion of the (E) silica sol such that the proportion of $SiO_2$ in the (E) silica sol becomes 1 part by mass to 99 parts by mass based on 1 part by mass of $SiO_2$ in the hydrolysate.

In order to produce the low refractive index film-forming composition of the present invention, first, the (D) organic solvent is added to the (A) silicon alkoxide, and the resultant is stirred preferably for 5 minutes to 20 minutes at 30° C. to 40° C., whereby a first solution is prepared. Moreover, in order to cause the composition to contain a hydrolysate of the (A) silicon alkoxide and the (F) fluoroalkyl group-containing silicon alkoxide, before the (A) silicon alkoxide and the (F) fluoroalkyl group-containing silicon alkoxide are added to the (D) organic solvent, the alkoxides are weighed and mixed together such that the aforementioned predetermined proportion is yielded. Meanwhile, the (B) water is mixed with the (C) inorganic acid or organic acid, and the resultant is stirred preferably for 5 minutes to 20 minutes at 30° C. to 40° C., whereby a second solution is prepared separately from the first solution. Tetramethoxysilane or the like used as the (A) silicon alkoxide is highly toxic. Accordingly, it is desirable to use an oligomer obtained by polymerizing a monomer thereof to a degree of polymerization of about 3 to 6.

Subsequently, the first solution prepared as above is preferably kept at 30° C. to 80° C., the second solution is added to the first solution, and the resultant is stirred preferably for 30 minutes to 180 minutes while being kept at the same temperature. As a result, a hydrolysate of the (A) silicon alkoxide or a hydrolysate of the (A) silicon alkoxide and the (F) fluoroalkyl group-containing silicon alkoxide is generated. Thereafter, the hydrolysate is mixed with the (E) silica sol, which is obtained by dispersing fumed silica particles in a liquid medium, at the aforementioned predetermined ratio, whereby the low refractive index film-forming composition of the present invention is obtained.

For preparing the (E) silica sol, as the liquid medium (dispersion medium) for dispersing fumed silica particles, in view of mixing properties, coating properties, and the like of the composition, it is preferable to use a medium that is of the same type as the (D) organic solvent used for generating the hydrolysate or a medium that is compatible with the above medium. Examples of the medium that is a dispersion medium other than the (D) organic solvent and compatible with the dispersion medium include alcohols such as butanol, ketones such as acetone and methyl ethyl ketone, and glycols such as ethylene glycol, propylene glycol, and hexylene glycol, N-methylpyrrolidone, dimethylformamide, and the like. Moreover, it is preferable to adjust the proportion of the fumed silica particles in the (E) silica sol such that the concentration of $SiO_2$ in the (E) silica sol becomes 5% by mass to 30% by mass. If the concentration of $SiO_2$ is lower than the lower limit of the above range, problems in that the refractive index of the film is not sufficiently reduced occur in some cases. If the concentration is higher than the upper limit of the above range, problems in that the transparency or hardness of the formed film deteriorates occur in some cases.

After the fumed silica particles are added to the dispersion medium, it is desirable to sufficiently disperse the particles by stirring them for 15 minutes to 90 minutes at a rotation frequency of 5,000 rpm to 20,000 rpm by using a homomixer before the particles are mixed with the hydrolysate. After being produced, fumed silica powder having a small particle size is aggregated in the form of beads and forms aggregates in many cases. However, if the above dispersion step is performed sufficiently, the size of the aggregate can be adjusted preferably to about 20 nm to 150 nm. If the dispersion step is not performed under the aforementioned conditions, the size of the aggregate falls outside the above range. As a result, the refractive index of the film is not sufficiently reduced as described above, or aforementioned problems occur in some cases. Moreover, if the dispersion step is performed excessively, it is not preferable since a problem in that the fumed silica particles form large aggregates occur and are precipitated without being dispersed.

Next, the method for forming a low refractive index film of the present invention will be described. The method for forming a low refractive index film of the present invention is the same as the method of the related art, except that the method of the present invention uses the aforementioned composition of the present invention or the composition obtained by the production method of the present invention. First, a substrate such as glass or plastic is prepared, and the surface of the substrate is coated with the aforementioned low refractive index film-forming composition by, for example, a spin coating method, a die coating method, a spraying method, or the like. After being coated, the resultant is dried preferably for 5 minutes to 60 minutes at 50° C. to 100° C. by using a hot plate, an atmospheric firing furnace, or the like. Subsequently, the resultant is cured by being fired preferably for 5 minutes to 120 minutes at 100° C. to 300° C. by using a hot plate, an atmospheric firing furnace, or the like. Inside the film formed in this manner, holes are appropriately formed, hence the film exhibits a refractive index of about 1.21 to 1.39 which is an extremely low level. Moreover, by exhibiting a high degree of water repellency, the film is also excellent in terms antifouling properties of the film surface. Therefore, the film can be preferably used for forming an antireflection film for preventing reflection of incident light in display panels such as a cathode ray tube, liquid crystals, and an organic EL, and glass for solar cells and a showcase; an intermediate film which is used in sensors, camera modules, and the like and utilizes a refractive index difference; or the like.

EXAMPLES

Next, examples and comparative examples of the present invention will be described in detail.

Example 1-1

First, tetramethoxysilane (TMOS) as the (A) silicon alkoxide and trifluoropropyl trimethoxysilane (TFPTMS) as the (F) fluoroalkyl group-containing silicon alkoxide were prepared. The alkoxides were weighed such that a proportion (mass ratio) of the (F) fluoroalkyl group-containing silicon alkoxide became 0.6 when the mass of the (A) silicon alkoxide was regarded as being 1, and mixed together by being put into a separable flask, thereby obtaining a mixture. As the (D) organic solvent, propylene glycol monomethyl ether acetate (PGMEA), which was in an amount of 1.0 part by mass based on a total of 1 part by mass of the (A) silicon alkoxide and the (F) fluoroalkyl group-containing silicon alkoxide, was added to the mixture, and the resultant was stirred for 15 minutes at 30° C., thereby preparing a first solution. As the (A) silicon alkoxide, an oligomer obtained in advance by polymerizing a monomer to a degree of polymerization of about 3 to 5 was used.

Moreover, the (B) deionized water, which was in an amount of 1.0 part by mass based on a total of 1 part by mass of the (A) silicon alkoxide and the (F) fluoroalkyl group-containing silicon alkoxide, and formic acid as the (C) organic acid which was in an amount of 0.01 parts by mass were mixed together by being put into a beaker, and the resultant was stirred for 15 minutes at 30° C., thereby preparing a second solution separately from the first solution. Subsequently, while the first solution prepared as above was being kept at 55° C. by using a water bath, the second solution was added to the first solution, and the resultant was stirred for 60 minutes while being kept at the above temperature. In this manner, a hydrolysate of the (A) silicon alkoxide and the (F) fluoroalkyl group-containing silicon alkoxide was obtained.

Thereafter, the hydrolysate obtained as above and the (E) silica sol in which the fumed silica particles (manufactured by Nippon Aerosil Co., Ltd., trade name: "AEROSIL200 (registered trademark)"), which were obtained by the gas-phase method (dry method) shown in Table 1 and had an average particle size of 40 nm and a specific surface area (BET value) of 200 m$^2$/g, had dispersed were mixed together at a ratio at which the proportion of SiO$_2$ in the (E) silica sol became 2 parts by mass based on 1 part by mass of SiO$_2$ in the hydrolysate. The resultant was then stirred, thereby obtaining a composition. The average particle size of the fumed silica particles is a volume-based median size measured using a dynamic light scattering-type particle size distribution analyzer. Moreover, the specific surface area (BET value) is a value measured by nitrogen gas adsorption and obtained using a value calculated by a 3-point BET method.

Before being mixed with the hydrolysate, the (E) silica sol was sufficiently dispersed by being stirred for 25 minutes at a rotation frequency of 14,000 rpm by using a homomixer (manufactured by PRIMIX Corporation), such that the size of the aggregate formed of the fumed silica particles aggregated in the form of beads became 100 nm.

Examples 1-2 and 1-3 and Comparative Examples 1-1 and 1-2

A composition was prepared in the same manner as in Example 1-1, except that the proportion of the (B) water determined when the proportion of the mixture consisting of the (A) silicon alkoxide and the (F) fluoroalkyl group-containing silicon alkoxide was regarded as being 1 part by mass was changed as shown in the following Table 1.

Examples 2-1 and 2-2 and Comparative Examples and 2-2

A composition was prepared in the same manner as in Example 1-1, except that the proportion of the (C) organic acid determined when the mixture consisting of the (A) silicon alkoxide and the (F) fluoroalkyl group-containing silicon alkoxide was regarded as being 1 part by mass was changed as shown in the following Table 1; the type of the dispersed fumed silica particles were changed to fumed silica particles (manufactured by Nippon Aerosil Co., Ltd., trade name: "AEROSIL R974 (registered trademark)") having an average particle size of 45 nm and a specific surface area (BET value) of 170 m$^2$/g; and the proportion of the (E) silica sol was changed such that the proportion of SiO$_2$ in the (E) silica sol based on 1 part by mass of SiO$_2$ in the hydrolysate became the proportion shown in the following Table 1.

Examples 3-1 to 3-5 and Comparative Examples 3-1 to 3-3

A composition was prepared in the same manner as in Example 1-1, except that the proportion of the (D) organic solvent determined when the amount of the mixture consisting of the (A) silicon alkoxide and the (F) fluoroalkyl group-containing silicon alkoxide was regarded as being 1 part by mass, the type of the (D) organic solvent, the proportion and type of the (C) inorganic acid or organic acid were changed as shown in the following Table 1; and the temperature of the water bath used when the second solution was added to the first solution was changed to 63° C. Moreover, in Example 3-1, only the temperature of the water bath was changed. In the table, "PGME" represents propylene glycol monomethyl ether.

Examples 4-1 and 4-2 and Comparative Examples 4-1 and 4-2

A composition was prepared in the same manner as in Example 1-1, except that the proportion of the (F) fluoroalkyl group-containing silicon alkoxide determined when the mass of the (A) silicon alkoxide was regarded as being 1, the proportion of the (B) water determined when the amount of the mixture consisting of the (A) silicon alkoxide and the (F) fluoroalkyl group-containing silicon alkoxide was regarded as being 1 part by mass, the proportion of the (C) organic acid, and the proportion of the (D) organic solvent were changed to the proportion shown in the following Table 1; the proportion of the (E) silica sol was changed such that the proportion of SiO$_2$ in the (E) silica sol based on 1 part by mass of SiO$_2$ in the hydrolysate became the proportion shown in the following Table 1; and the type of the dispersed fumed silica particles were changed to fumed silica particles (manufactured by Nippon Aerosil Co., Ltd., trade name: "AEROSIL R106 (registered trademark)") having an average particle size of 37 nm and a specific surface area (BET value) of 260 m$^2$/g.

TABLE 1

| | Silicon alkoxide (A) Type | Silicon alkoxide Type | Water (B) | | Inorganic acid or organic acid (C) | | Organic solvent (D) | | Silica sol (E) | | |
|---|---|---|---|---|---|---|---|---|---|---|---|
| | | | Mass ratio | Proportion [parts by mass] | Type | Proportion [parts by mass] | Type | Proportion [parts by mass] | Silica particles Type | product number | Proportion [parts by mass] |
| Comparative Example 1-1 | TMOS | TFPTMS | 0.6 | 0.4 | Formic acid | 0.01 | PGMEA | 1.0 | Gas-phase method | 200 | 2 |
| Example 1-2 | TMOS | TFPTMS | 0.6 | 0.5 | Formic acid | 0.01 | PGMEA | 1.0 | Gas-phase | 200 | 2 |

TABLE 1-continued

| | Silicon alkoxide (A) Type | Silicon alkoxide Type | Mass ratio | Water (B) Proportion [parts by mass] | Inorganic acid or organic acid (C) Type | Proportion [parts by mass] | Organic solvent (D) Type | Proportion [parts by mass] | Silica sol (E) Silica particles Type | product number | Proportion [parts by mass] |
|---|---|---|---|---|---|---|---|---|---|---|---|
| Example 1-1 | TMOS | TFPTMS | 0.6 | 1.0 | Formic acid | 0.01 | PGMEA | 1.0 | Gas-phase method | 200 | 2 |
| Example 1-3 | TMOS | TFPTMS | 0.6 | 2.0 | Formic acid | 0.01 | PGMEA | 1.0 | Gas-phase method | 200 | 2 |
| Comparative Example 1-2 | TMOS | TFPTMS | 0.6 | 3.0 | Formic acid | 0.01 | PGMEA | 1.0 | Gas-phase method | 200 | 2 |
| Comparative Example 2-1 | TMOS | TFPTMS | 0.6 | 1.0 | Formic acid | 0.003 | PGMEA | 1.0 | Gas-phase method | R974 | 3 |
| Example 2-1 | TMOS | TFPTMS | 0.6 | 1.0 | Formic acid | 0.005 | PGMEA | 1.0 | Gas-phase method | R974 | 3 |
| Example 2-2 | TMOS | TFPTMS | 0.6 | 1.0 | Formic acid | 0.5 | PGMEA | 1.0 | Gas-phase method | R974 | 3 |
| Comparative Example 2-2 | TMOS | TFPTMS | 0.6 | 1.0 | Formic acid | 0.7 | PGMEA | 1.0 | Gas-phase method | R974 | 3 |
| Comparative Example 3-1 | TMOS | TFPTMS | 0.6 | 1.0 | Formic acid | 0.01 | PGMEA | 0.8 | Gas-phase method | 200 | 2 |
| Example 3-1 | TMOS | TFPTMS | 0.6 | 1.0 | Formic acid | 0.01 | PGMEA | 1.0 | Gas-phase method | 200 | 2 |
| Example 3-2 | TMOS | TFPTMS | 0.6 | 1.0 | Oxalic acid | 0.02 | PGMEA | 1.0 | Gas-phase method | 200 | 2 |
| Example 3-3 | TMOS | TFPTMS | 0.6 | 1.0 | Acetic acid | 0.01 | PGMEA | 1.0 | Gas-phase method | 200 | 2 |
| Example 3-4 | TMOS | TFPTMS | 0.6 | 1.0 | Hydrochloric acid | 0.01 | PGMEA | 1.0 | Gas-phase method | 200 | 2 |
| Example 3-5 | TMOS | TFPTMS | 0.6 | 1.0 | Formic acid | 0.01 | PGME | 5.0 | Gas-phase method | 200 | 2 |
| Comparative Example 3-2 | TMOS | TFPTMS | 0.6 | 1.0 | Formic acid | 0.01 | PGMEA | 7.0 | Gas-phase method | 200 | 2 |
| Comparative Example 3-3 | TMOS | TFPTMS | 0.6 | 1.0 | Formic acid | 0.01 | Isobutyl | 1.0 | Gas-phase method | 200 | 2 |
| Comparative Example 4-1 | TMOS | TFPTMS | 1.0 | 1.2 | Formic acid | 0.02 | PGMEA | 2.5 | Gas-phase method | R106 | 0.9 |
| Example 4-1 | TMOS | TFPTMS | 1.0 | 1.2 | Formic acid | 0.02 | PGMEA | 2.5 | Gas-phase method | R106 | 1 |
| Example 4-2 | TMOS | TFPTMS | 1.0 | 1.2 | Formic acid | 0.02 | PGMEA | 2.5 | Gas-phase method | R106 | 99 |
| Comparative Example 4-2 | TMOS | TFPTMS | 1.0 | 1.2 | Formic acid | 0.02 | PGMEA | 2.5 | Gas-phase method | R106 | 100 |

Example 5-1

First, tetramethoxysilane (TMOS) was prepared as the (A) silicon alkoxide, and as the (D) organic solvent, propylene glycol monomethyl ether acetate (PGMEA) in an amount of 1.5 parts by mass based on 1 part by mass of the (A) silicon alkoxide was added thereto. The resultant was stirred for 15 minutes at 30° C., thereby preparing a first solution. As the (A) silicon alkoxide, an oligomer obtained in advance by polymerizing a monomer to a degree of polymerization of about 3 to 5 was used.

Moreover, the (B) deionized water, which was in an amount of 1.0 part by mass based on 1 part by mass of the (A) silicon alkoxide, and the (C) organic acid which was in an amount of 0.02 parts by mass were mixed together by being put into a beaker, and the resultant was stirred for 15 minutes at 30° C., thereby preparing a second solution separately from the first solution. Subsequently, while the first solution prepared as above was being kept at 55° C. by using a water bath, the second solution was added to the first solution, and the resultant was stirred for 60 minutes while being kept at the above temperature. In this manner, a hydrolysate of the (A) silicon alkoxide was obtained.

The hydrolysate was then mixed with the (E) silica sol under stirring in the same manner as in Example 1-1, thereby obtaining a composition. Before being mixed with the hydrolysate, the (E) silica sol was sufficiently dispersed by being stirred for 25 minutes at a rotation frequency of 16,000 rpm by using a homomixer, such that the size of the aggregate formed of the fumed silica particles aggregated in the form of beads became 90 nm. That is, the composition was prepared without adding the (F) fluoroalkyl group-containing silicon alkoxide.

Example 5-2

A composition was prepared in the same manner as in Example 5-1, except that tetraethoxysilane (TEOS) was used instead of tetramethoxysilane (TMOS) as the (A) silicon alkoxide.

Example 5-3

A composition was prepared in the same manner as in Example 5-1, except that the type of the (C) inorganic acid or organic acid was changed as shown in the following Table 2.

Examples 5-4 to 5-6

A composition was prepared in the same manner as in Example 5-1, except that tetraethoxysilane (TEOS) was used instead of tetramethoxysilane (TMOS) as the (A) silicon alkoxide; the (F) fluoroalkyl group-containing silicon alkoxide was mixed in the proportion shown in the following Table 2 based on 1 part by mass of the (A) silicon alkoxide, according to the same procedure as in Example 1-1; and the proportion of the (B) water, the proportion of the (C) organic acid, and the proportion of the (D) organic solvent were changed such that the proportion was determined as shown in the following Table 2 based on 1 part by mass of the mixture consisting of the (A) silicon alkoxide and the (F) fluoroalkyl group-containing silicon alkoxide.

Comparative Example 5

A composition was prepared in the same manner as in Example 5-1, except that the (F) silica which was obtained by dispersing colloidal silica particles (NISSAN CHEMICAL INDUSTRIES, LTD., trade name; "ST-O") obtained by a wet method and having an average particle size of 20 nm and a specific surface area (BET value) of 130 m$^2$/g instead of dispersing the fumed silica particles obtained by a gas-phase method (dry method), was used; the proportion of the (E) silica sol was changed such that the proportion of SiO$_2$ in the (E) silica sol based on 1 part by mass of SiO$_2$ in the hydrolysate was determined as shown in the following Table 2; and the type of the (D) organic solvent was changed.

TABLE 2

| | Silicon alkoxide (A) Type | Silicon alkoxide Type | Water (B) Mass ratio | Water (B) Proportion [parts by mass] | Inorganic acid or organic acid (C) Type | Inorganic acid or organic acid (C) Proportion [parts by mass] | Organic solvent (D) Type | Organic solvent (D) Proportion [parts by mass] | Silica sol (E) Silica particles Type | Silica sol (E) Silica particles Product number | Silica sol (E) Proportion [parts by mass] |
|---|---|---|---|---|---|---|---|---|---|---|---|
| Example 5-1 | TMOS | — | 0 | 1.0 | Formic acid | 0.02 | PGMEA | 1.5 | Gas-phase | 200 | 4 |
| Example 5-2 | TEOS | — | 0 | 1.0 | Formic acid | 0.02 | PGMEA | 1.5 | Gas-phase | 200 | 4 |
| Example 5-3 | TMOS | — | 0 | 1.0 | Hydrochloric acid | 0.02 | PGMEA | 1.5 | Gas-phase method | 200 | 4 |
| Example 5-4 | TEOS | TFPTMS | 0.4 | 1.0 | Formic acid | 0.02 | PGMEA | 1.5 | Gas-phase | 200 | 4 |
| Example 5-5 | TEOS | TFPTMS | 1.6 | 1.0 | Formic acid | 0.02 | PGMEA | 1.5 | Gas-phase | 200 | 4 |
| Example 5-6 | TEOS | TFPTMS | 1.8 | 1.0 | Formic acid | 0.02 | PGMEA | 1.5 | Gas-phase | 200 | 4 |
| Comparative Example 5 | TEOS | — | 0 | 1.0 | Formic acid | 0.02 | PGMS | 1.5 | Wet method | ST-0 | 3 |

<Test for Comparison and Evaluation>

The surface of glass substrates as substrates was coated with the composition prepared in Examples 1-1 to 5-6 and Comparative Examples 1-1 to 5 by a spin coating method, thereby forming coating films. The glass substrate in which the coating film had been formed was dried for 10 minutes at 50° C. by using an atmospheric firing furnace, and then cured by being fired at 130° C. by using the atmospheric firing furnace, thereby forming a film having a thickness of about 80 Å. The film was evaluated in terms of the refractive index and the adhesiveness between the film and the glass substrate. The results are shown in the following Table 3.

(i) Refractive index: The refractive index was measured using a spectroscopic ellipsometer (manufactured by J.A.Woollam Japan Co., Inc., model number: M-2000) and expressed as a value at 633 nm based on an analyzed optical constant.

(ii) Adhesiveness: Specifically, based on the adhesion evaluation by a cross-cut method according to JIS K5600, the adhesiveness of the film was evaluated and classified into 6 grades. In the 6 classes, the films of class 4 and class 5 were evaluated to be "unacceptable" since the film was seriously peeled from the cut portion, the films of class 0 and class 1 were evaluated to be "excellent", and the films of class 2 and class 3 were evaluated to be "acceptable".

TABLE 3

| | Refractive index | Adhesiveness | Contact angle (degree) |
|---|---|---|---|
| Comparative Example 1-1 | 1.43 | Excellent | 40 |
| Example 1-1 | 1.31 | Excellent | 112 |
| Example 1-2 | 1.24 | Excellent | 115 |
| Example 1-3 | 1.22 | Acceptable | 110 |
| Comparative Example 1-2 | — | Unacceptable | — |
| Comparative Example 2-1 | 1.41 | Excellent | 89 |
| Example 2-1 | 1.30 | Excellent | 119 |
| Example 2-2 | 1.28 | Excellent | 121 |
| Comparative Example 2-2 | — | Unacceptable | — |
| Comparative Example 3-1 | 1.42 | Unacceptable | 72 |
| Example 3-1 | 1.25 | Excellent | 106 |
| Example 3-2 | 1.35 | Acceptable | 109 |
| Example 3-3 | 1.33 | Acceptable | 105 |
| Example 3-4 | 1.29 | Excellent | 111 |
| Example 3-5 | 1.30 | Excellent | 104 |
| Comparative Example 3-3 | 1.44 | Acceptable | 60 |
| Comparative Example 4-1 | 1.42 | Acceptable | 72 |
| Example 4-1 | 1.37 | Acceptable | 99 |
| Example 4-2 | 1.23 | Acceptable | 121 |
| Comparative Example 4-2 | — | Unacceptable | 119 |
| Example 5-1 | 1.38 | Acceptable | 90 |
| Example 5-2 | 1.38 | Acceptable | 92 |
| Example 5-3 | 1.37 | Acceptable | 92 |
| Example 5-4 | 1.34 | Acceptable | 101 |
| Example 5-5 | 1.30 | Acceptable | 116 |
| Example 5-6 | 1.20 | Unacceptable | 114 |
| Comparative Example 5 | 1.40 | Unacceptable | 45 |

As clearly shown in Table 3, from the comparison between Examples 1-1 to 1-3 and Comparative Examples 1-1 as well as 1-2, it was found that in Comparative Example 1-1 in which the proportion of the (B) water was lower than the lower limit of the range of the present invention, the refractive index of the film was high, and a sufficient antireflection effect was not obtained. Presumably, this is because the hydrolysis reaction did not occur to a sufficient degree, and thus a coat could not be sufficiently formed. Moreover, the contact angle was equal to or smaller than 100° which is a low value, and sufficient water repellency and antifouling properties were not obtained. In contrast, in Comparative Example 1-2 in which the proportion of the (B) water was higher than the upper limit of the range of the present invention, the amount of water added was larger than an appropriate amount, and accordingly, the hydrolysis reaction could not be controlled. Consequently, solids were generated in the hydrolysate, and the composition was suspended and thickened, hence a coat having an intended thickness could not be formed. As a result, the refractive index and contact angle of the film could not be measured, and the adhesiveness between the film and the substrate deteriorated. On the contrary, from Examples 1-1 to 1-3, in which the (B) water was added in a predetermined proportion, excellent results were obtained in all of the evaluations.

From the comparison between Examples 2-1 as well as 2-2 and Comparative Examples 2-1 as well as 2-2, it was found that in Comparative Example 2-1 in which the proportion of the (C) organic acid was lower than the lower limit of the range of the present invention, the hydrolysis reaction did not occur to a sufficient degree, and a film having a low refractive index and a sufficient antireflection effect was not obtained. Moreover, the contact angle was equal to or smaller than 100° which is a low value, and sufficient water repellency and antifouling properties were not obtained. In contrast, in Comparative Example 2-2 in which the proportion of the (C) organic acid was higher than the upper limit of the range of the present invention, the acidity of the solution increased due to the excess amount of organic acid, and the composition was suspended when the (E) silica sol was mixed in. As a result, the refractive index and contact angle of the film could not be measured, and the adhesiveness between the film and the substrate deteriorated. On the contrary, from Examples 2-1 and 2-2, in which the (C) organic acid was added in a predetermined proportion, excellent results were obtained in all of the evaluations.

From the comparison between Examples 3-1 to 3-5 and Comparative Examples 3-1 to 3-3, it was found that in Comparative Example 3-1 in which the proportion of the (D) organic solvent was lower than the lower limit of the range of the present invention, the refractive index of the film was high, the contact angle was small, and the adhesiveness between the film and the substrate deteriorated. In contrast, in Comparative Example 3-2 in which the proportion of the (D) organic solvent was higher than the upper limit of the range of the present invention, the proportion of the (D) organic solvent was outside an appropriate range. Accordingly, the hydrolysis reaction could not be controlled, and a film having a low refractive index and a sufficient antireflection effect could not be obtained. Moreover, the contact angle was equal to or smaller than 100° which is a low value, and sufficient water repellency and antifouling properties were not obtained. Further, in Comparative Example 3-3 in which isobutyl acetate was used as the (D) organic solvent, the solution was suspended at a point in time when the first solution containing isobutyl acetate was mixed with the second solution containing deionized water. Accordingly, an intended solution could not obtained, and a film could not be formed. On the contrary, from Examples 3-1 to 3-5, in which the predetermined (D) organic solvent was added in a predetermined proportion, excellent results were obtained in all of the evaluation.

From the comparison between Examples 4-1 as well as 4-2 and Comparative Examples 4-1 as well as 4-2, it was found that in Comparative Example 4-1 in which the proportion of the (E) silica sol was lower than the lower limit of the range of the present invention, the refractive index of the film was high, and a sufficient antireflection effect was not obtained. Moreover, the contact angle was small, and sufficient water repellency and antifouling properties were not obtained. In contrast, in Comparative Example 4-2 in which the proportion of the (E) silica sol was higher than the upper limit of the range of the present invention, the film had large concavities and convexities. Accordingly, the refractive index could not be evaluated, and the adhesiveness thereof also deteriorated. On the contrary, from Examples 4-1 and 4-2, in which the (E) silica sol was added in a predetermined proportion, excellent results were obtained in all of the evaluations.

From the comparison between Examples 5-1 to 5-3 and Examples 5-4 to 5-6, it was found that from Examples 5-1 to 5-3 in which the (F) fluoroalkyl group-containing silicon alkoxide was not used, relatively excellent results were obtained by the evaluation. However, the results obtained from Examples 5-4 to 5-6, in which the (F) fluoroalkyl group-containing silicon alkoxide was added, showed that the refractive index thereof was lower and the antireflection effect, water repellency, and antifouling properties thereof were excellent. Moreover, Example 5-6, in which the (F) fluoroalkyl group-containing silicon alkoxide was added in a slightly large amount, was evaluated to be extremely excellent in terms of the refractive index and water repellency, but the adhesiveness slightly deteriorated.

In Comparative Example 5 using the (E) silica sol, which was obtained by dispersing silica particles obtained by a wet method instead of the fumed silica particles obtained by a gas-phase method (dry method), particularly the contact angle markedly deteriorated, and excellent water repellency and antifouling properties were not obtained. Moreover, the refractive index was high, and a sufficient antireflection effect was not obtained. In contrast, Examples 1-1 to 5-6 using the (E) silica sol obtained by dispersing the fumed silica particles were evaluated to be excellent particularly in terms of transparency and water repellency.

The low refractive index film-forming composition of the present invention can be used for forming an antireflection film for preventing reflection of incident light in display panels such as a cathode ray tube, liquid crystals, and an organic EL, glass for solar cells and showcase, and the like. Alternatively, the composition can be used for forming an intermediate film which is used in sensors, camera modules, and the like and utilizes a refractive index difference.

The invention claimed is:

1. A low refractive index film-forming composition comprising a hydrolysate of a silicon alkoxide and a silica-sol, wherein the silica-sol comprises silica particles having an average particle size within a range of 37 nm to 50 nm, and wherein the composition is prepared by:
  (1) generating a hydrolysate of (A) a silicon alkoxide by:
    (i) mixing (A) a silicon alkoxide of Chemical Formula (1):

$$Si(OR)_4 \quad (1)$$

wherein R is an alkyl group having 1 to 5 carbon atom, with (F) a fluoroalkyl group-containing silicon alkoxide of Chemical Formula (2):

$$CF_2(CF_2)nCH_2CH_2Si(OR^1)_3 \quad (2)$$

wherein $R^1$ is an alkyl group having 1 to 5 carbon atoms, and n is an integer from 0 to 8,
    in a mass ratio of 1:0.6 to 1.6 (A:F), and
    (ii) mixing the (A) silicon alkoxide and the (F) fluoroalkyl group-containing silicon alkoxide with:
      (B) water in a proportion of 0.5 parts by mass to 2.0 parts by mass,
      (C) an inorganic acid or an organic acid in a proportion of 0.005 parts by mass to 0.5 parts by mass, and (D) an organic solvent in a proportion of 1.0 part by mass to 5.0 parts by mass based on 1 part by mass of the (A) silicon alkoxide and (F), wherein the organic solvent is an alcohol, a glycol ether, or a glycol ether acetate, to form a hydrolysate of the silicon alkoxide, and (2) mixing the hydrolysate of the silicon alkoxide with (E) a silica sol, wherein the (E) silica sol is obtained by dispersing fumed silica particles having an average particle size within a range of 37 nm to 50 nm and a specific surface area (BET value) within a range of 50 m$^2$/g to 400 m$^2$/g in a liquid medium, and wherein the SiO$_2$ in the (E) silica sol is 1 part by mass to 99 parts by mass of the (E) silica sol when a proportion of SiO$_2$ in the hydrolysate is regarded as being 1 part by mass.

2. The method for producing a low refractive index film-forming composition of claim 1 comprising, (1) generating a hydrolysate of (A) a silicon alkoxide by:
(i) mixing (A) a silicon alkoxide of Chemical Formula (1):

$$Si(OR)_4 \qquad (1)$$

wherein R is an alkyl group having 1 to 5 carbon atom, with (F) a fluoroalkyl group-containing silicon alkoxide of Chemical Formula (2):

$$CF_2(CF_2)nCH_2CH_2Si(OR^1)_3 \qquad (2)$$

wherein R$^1$ is an alkyl group having 1 to 5 carbon atoms, and n is an integer from 0 to 8, in a mass ratio of 1:0.6 to 1.6 (A:F), and (ii) mixing the (A) silicon alkoxide and the (F) fluoroalkyl group-containing silicon alkoxide with:
(B) water in a proportion of 0.5 parts by mass to 2.0 parts by mass,
(C) an inorganic acid or an organic acid in a proportion of 0.005 parts by mass to 0.5 parts by mass, wherein the inorganic or organic acid is oxalic acid, acetic acid, or formic acid, and
(D) an organic solvent in a proportion of 1.0 part by mass to 5.0 parts by mass based on 1 part by mass of the (A) and (F), wherein the organic solvent is an alcohol, a glycol ether, or a glycol ether acetate, to form a hydrolysate of the silicon alkoxide, and (2) mixing the hydrolysate of the silicon alkoxide with (E) a silica sol, wherein the (E) silica sol is obtained by dispersing fumed silica particles having an average particle size within a range of 37 nm to 50 nm and a specific surface area (BET value) within a range of 50 m$^2$/g to 400 m$^2$/g in a liquid medium, and wherein the SiO$_2$ in the (E) silica sol is 1 part by mass to 99 parts by mass of the (E) silica sol when a proportion of SiO$_2$ in the hydrolysate is regarded as being 1 part by mass.

* * * * *